United States Patent [19]

Bardy

[11] Patent Number: 5,488,381
[45] Date of Patent: Jan. 30, 1996

[54] METHOD FOR THE MANAGEMENT OF THE BEAM OF AN ELECTRONICALLY SCANNED ROTATING ANTENNA

[75] Inventor: Marie-Claude Bardy, Massy, France

[73] Assignee: Thomson-CSF, Paris, France

[21] Appl. No.: 313,907

[22] Filed: Sep. 28, 1994

[30] Foreign Application Priority Data

Sep. 28, 1993 [FR] France .................................. 93 11503

[51] Int. Cl.$^6$ .............................. H01Q 3/22; G01S 13/00
[52] U.S. Cl. ............................ 342/372; 342/96; 342/377
[58] Field of Search .................................. 342/368, 372, 342/96, 377

[56] References Cited

U.S. PATENT DOCUMENTS

| | | |
|---|---|---|
| 4,649,390 | 3/1987 | Andrews et al. . |
| 4,720,711 | 1/1988 | Quesinberry et al. ..................... 342/96 |
| 5,036,333 | 7/1991 | Chapman et al. . |
| 5,289,189 | 2/1994 | Colegrove ................................. 342/95 |

FOREIGN PATENT DOCUMENTS

0440200  8/1991  European Pat. Off. .

OTHER PUBLICATIONS

Kim K. Pham, "Location Accuracy in X–Band Multifunction Radar," Proceedings of the 1991 IEEE National Radar Conference, Sheraton Plaza La Reina Hotel, Los Angeles, CA, Mar. 12–13, 1991, pp. 6–10.

Steven T. Cummings and Kenneth Behar, "Radar Resource Management for Mechanically Rotated, Electronically Scanned Phased Array Radars," Proceedings of the 1991 IEEE National Radar Conference, Sheraton Plaza La Reina Hotel, Los Angeles CA, Mar. 12–13, 1991, pp. 88–92.

W. A. Mulle, "A Radar/Phased Array Radar Primer," RCA Engineer, No. 31–5, Sep./Oct./Nov. 1986, pp. 68–76.

*Primary Examiner*—Gregory C. Issing
*Attorney, Agent, or Firm*—Oblon, Spivak, McClelland, Maier & Neustadt

[57] ABSTRACT

Disclosed is a method for the management of the beam of an electronically scanned rotating antenna. For each antenna rotation, the sequencing of the commands is organized in three phases associated with zones of the space: a first phase of preparation of the requested aiming operations before their entry into the visibility cone of the antenna; a second phase of carrying out the requested aiming operations present in the visibility cone; a third phase of identifying the requested aiming operations that have come out from the visibility cone and have not been carried out. Application to multi-function radars.

10 Claims, 9 Drawing Sheets

METHOD FOR THE MANAGEMENT OF THE BEAM OF AN ELECTRONICALLY SCANNED ROTATING ANTENNA

BACKGROUND OF THE INVENTION

The present invention relates to a method for the management of the beam of an electronically scanned rotating antenna. It can be applied notably to multi-function radars that are fixed or mobile in relation to their surroundings, the mobile radars being, for example, sea-based radars.

The conjoint use of a rotating antenna and electronic scanning system makes it possible to obtain a multi-function radar that can be easily adapted to its environment, fulfilling a watch function and a tracking function for example. Electronic scanning makes it possible, for a given antenna position, to point or aim the beam in any direction located within a cone called a visibility cone. The dimensions of the cone are defined notably by the maximum deflection permitted in azimuth and in elevation.

A radar such as this calls for the presence of a device that must give it real-time information on the characteristics of the beam to be sent out, notably its position and the waveform sent, these characteristics constituting the command of the beam. The management of the beam consists of the real-time organization of the succession or sequencing of the commands of the beam that are to be carried out by the radar.

This type of radar has been called upon to perform an ever increasing number of functions. Thus, to the functions of watching the space that surrounds the radar and of tracking targets, there have been added specific watching functions, measurements on targets entering a given template, anti-jamming actions as well as the absence of transmissions in certain directions. Subsequently, the threat specifications have become more precise and the templates of the targets to be tracked have become more stringent. The tasks required of the radar system have become bigger, notably with the introduction of firing control tasks. In view of these required performance characteristics, the catalogue of available waveforms has grown. New modes of operation have been defined, notably relating to the confirmation of new objects in the same antenna rotation as that of the watching that had given rise to the detection. There has arisen the notion of urgent loops of the type comprising the following succession of operations: watching—confirmation or tracking of engaged target—remote control commands. Some of these tasks dictate fast reaction times inside the radar system.

Finally, some of these functions, notably the tracking of targets associated with increasingly stringent templates, have dictated higher antenna rotation speeds of up to about one rotation per second for example.

At these speeds, for the watching function, it becomes difficult to visit all of the space under watch in one antenna rotation. The watching function should, however, continue to be fulfilled.

SUMMARY OF THE INVENTION

It is an aim of the invention, notably, to enable an electronically scanned rotating antenna radar to fulfil the watching function while at the same time giving it rotational speed with a large number of functions to be accomplished.

To this end, an object of the invention is a method for the management of the beam of an electronically scanned rotating antenna on the basis of requests for the aiming of the beam, said method organizing the sequencing or succession of the aiming commands given to a system for the formation of the beam by means of a table of commands comprising the parameters needed to carry out the aiming operations, the antenna having a visibility cone in which the electronic scanning enables the aiming operations to be performed, wherein, with the position of the antenna being identified according to an angular step, the passage from one step another generating a synchronization signal, for each antenna rotation, the sequencing of the commands is organized in three phases, each associated with one zone of the space:

a first phase of preparation of the requested aiming operations before their entry into the visibility cone, said phase consisting in defining the parameters of the table of the commands associated with each requested aiming operation;

a second phase of carrying out the requested aiming operations present in the visibility cone, a new table of commands being sent from each synchronization signal as a function of the aiming operations that have not yet been carried out;

a third phase of identifying the requested aiming operations that have come out from the visibility cone and have not yet been carried out, these aiming operations being memorized and carried out in a following rotation, it being possible that a non-performed aiming operation will be relinquished.

The main advantages of the invention are that it makes it possible to optimize the radar occupancy time, makes it easy to adapt the characteristics of the command of the beam to the environmental information elements derived from the processing of radar data elements and enables the renewal of the watching operation to be adapted to the load of the radar.

BRIEF DESCRIPTION OF THE DRAWINGS

Other features and advantages of the invention will appear from the following description, made with reference to the appended drawings, of which.

DESCRIPTION OF THE INVENTION

Figure 1:
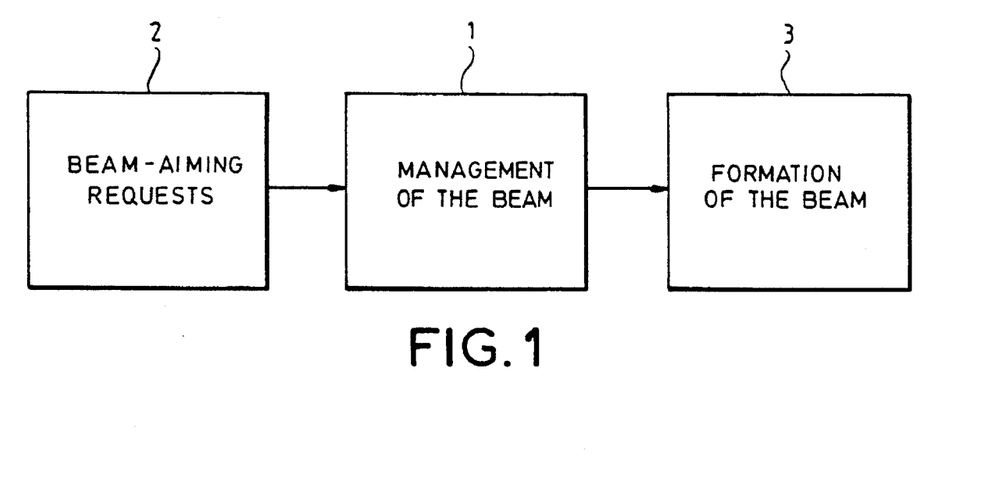
FIG. 1 illustrates the role of the management of the beam of an electronically scanned rotating antenna.

FIG. 1 illustrates the role of the management means 1 of the beam of a electronically scanned rotating antenna. Requests 2 for aimings of the beam given, for example, by the processing system of a multi-function radar using the above-mentioned antenna, are given to the beam management means 1. These aimings or operations are, for example, designed to fulfil several functions, notably a target-watching and target-tracking function. The beam management means give a beam formation system 3 the sequencing of the beam aiming commands to be carried out. The beam management means have the role of organizing this sequencing from among all the beam aiming operations to be carried out, in taking account notably of the antenna rotation speed or rate.

Figure 2:
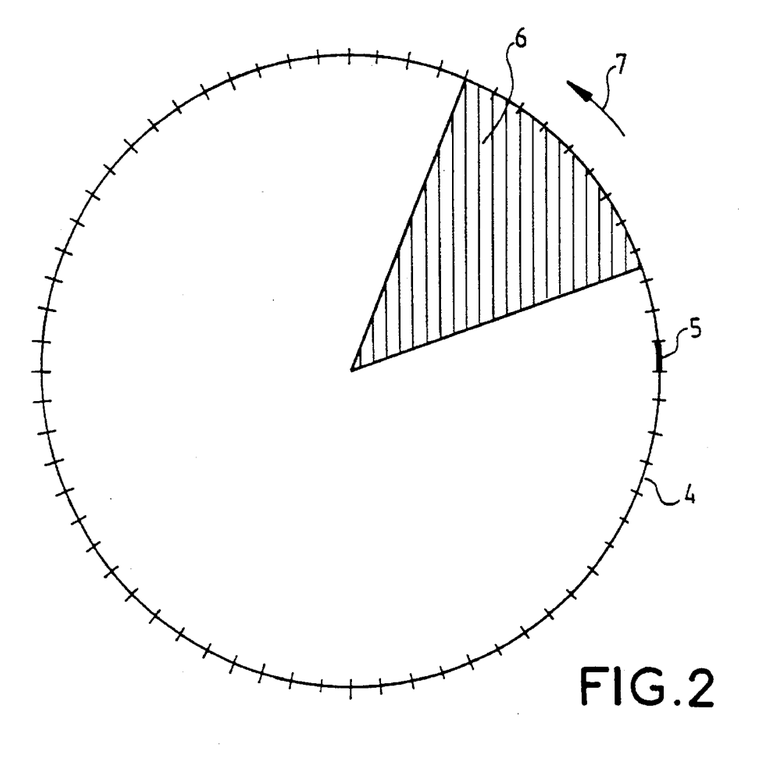
FIG. 2 illustrates the rotation of the above-mentioned beam and of its visibility cone.

FIG. 2 shows the rotation of the antenna by a circular trajectory 4 described in azimuth for example. The position of the antenna is referenced according to an angular or circular step 5 that is regular for example. The antenna has a visibility cone 6 within which the electronic scanning can perform any operation of aiming the beam. This cone 6 rotates with the antenna as is symbolized by an arrow 7.

Figure 3:
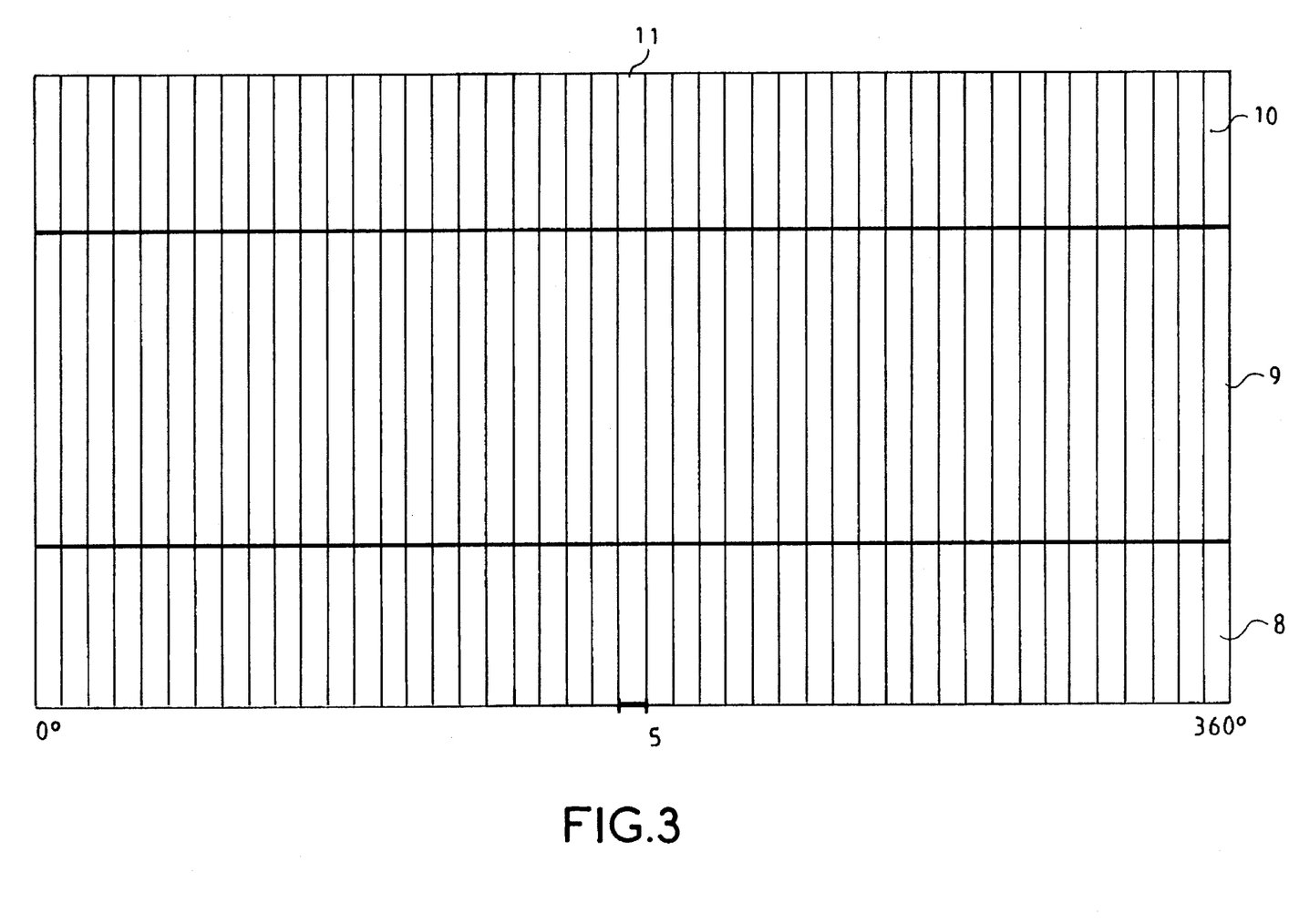
FIG. 3 shows a spread-out view of the space surrounding the antenna, partitioned into columns.

FIG. 3 shows the space surrounding the antenna, spread out from 0° to 360°. This spread-out or unfolding is limited at the top and the bottom by the limits of reach of the beam of the antenna. It may be divided into several zones, for example a low altitude zone 8, a medium altitude zone 9 and a high altitude zone 10. Each circular step 5 defines a column 11, the spread-out space being thus formed by a sequence of columns. The angular width is equal, for example, to some degrees and is notably substantially smaller than that of the visibility cone 6.

Figure 4:
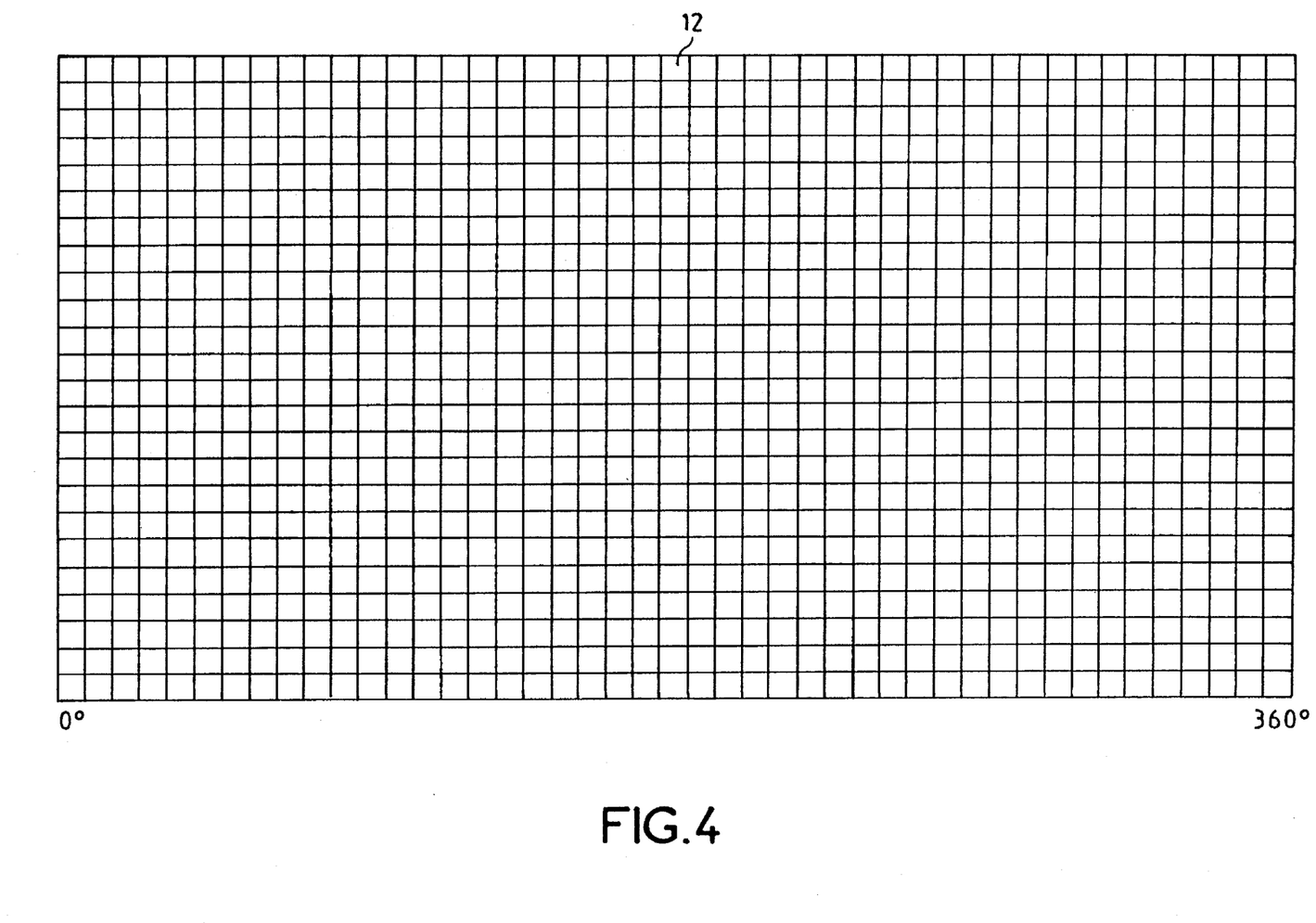
FIG. 4 shows the foregoing space partitioned into elementary aiming spaces.

FIG. 4 shows the above space partitioned into elementary aiming spaces that are regular or not regular. Each elementary space, referenced in an x, y, z referential, is associated, for example, with an operation of aiming the beam of the antenna.

Figure 5:
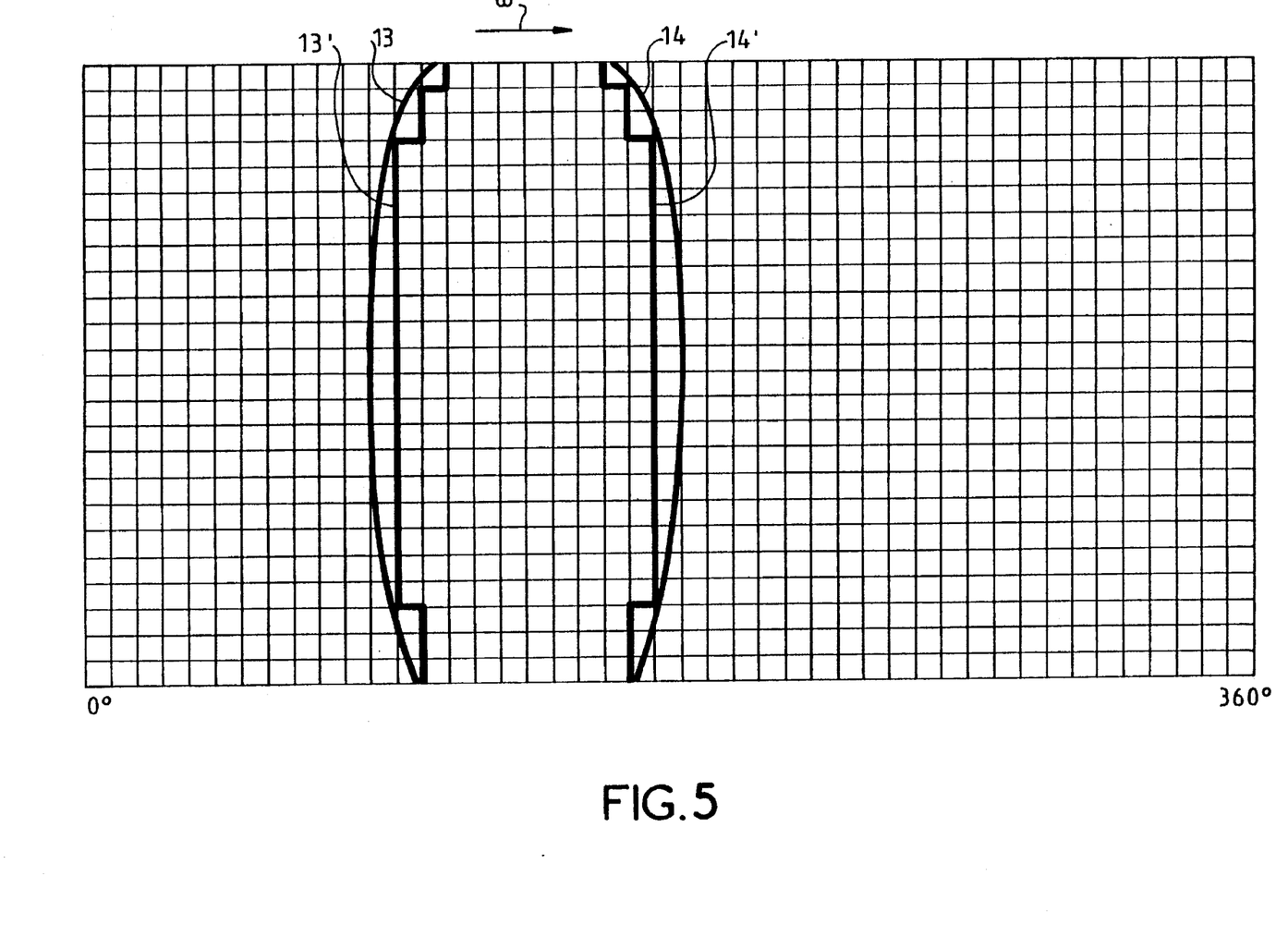
FIG. 5 illustrates a position of the visibility cone of the antenna in the above-mentioned space.

FIG. 5 illustrates a given position, at a given instant, of the visibility cone demarcated by two curves 13, 14 in this partitioned space. This cone shifts at the rate or speed w of rotation of the antenna. Since this cone cuts through elementary aiming spaces, it is replaced for example by a narrower cone 13', 14' that is inscribed within itself and does not cut through any elementary aiming spaces. For each given position of the cone, the method according to the invention organizes the sequencing of the operations for aiming the antenna beam inside this cone, each beam directing, for example, the beam towards an elementary aiming space 12. As indicated here above, an aiming operation may be associated with an elementary space 12 and it is possible to make use of either one of these notions without distinction. The method according to the invention is based on a notion of the life of the aiming operations. An aiming operation takes birth as soon as a request appears: this request could come from the processing system of a radar or could be generated automatically, for example in the case of the watch function. Except for urgent aiming operations, relating for example to the confirmation of a detection or to a remote control command, the aiming operation lives for a certain period of time before entering the visibility cone 6. An aiming operation dies when it leaves the visibility cone and when the information elements relating to its performance are exploited, i.e. when the aiming has, for example, actually taken place.

Figure 6:
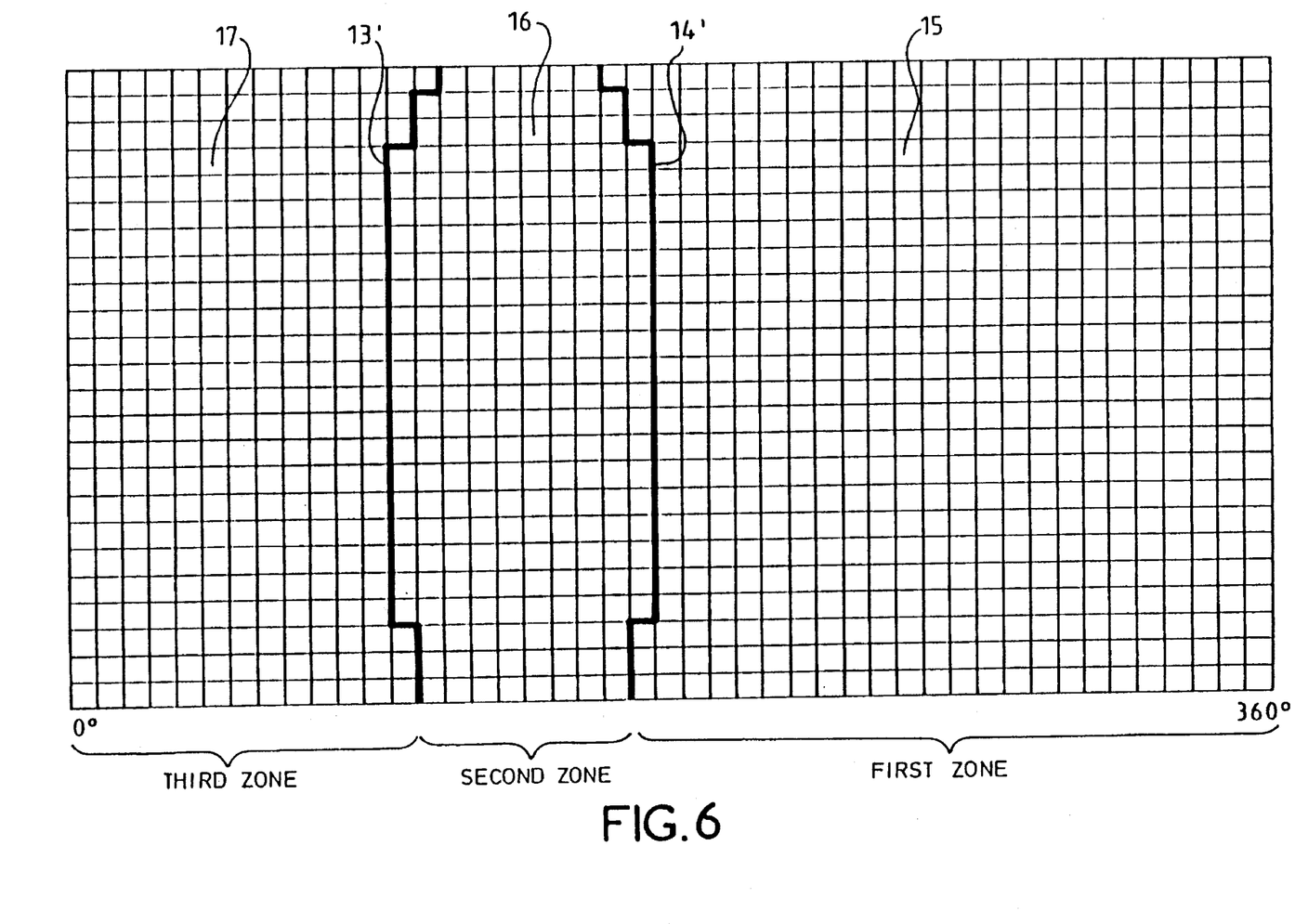
FIG. 6 shows the above-mentioned space partitioned into three zones as a function of the position of the visibility cone.

As illustrated in FIG. 6, it is then possible, for a given position of the antenna, namely a given position of its visibility cone, to define three zones 15, 16, 17: a first zone 15 of the birth of the non-urgent aiming operations that are not yet present in the visibility cone, a second zone 16 notably of the birth of the urgent aiming operations, present in the visibility cone, and a third zone 17 of the death of the aiming operations that have just left the visibility cone. A zone of birth of an aiming operation preferably starts at an antenna position ensuring that the same aiming operation, if it exists at the previous rotation, is actually defunct. The lifetime of an aiming operation is thus smaller than the duration of an antenna rotation.

According to the invention, whenever the antenna crosses a circular step 5, a synchronization signal is generated. Since an initial step has been identified, this makes it possible to give an indication, after each synchronization signal, of that step in which the antenna, and hence the visibility cone, is moving and makes it possible to liken the continuous shift of the cone to a discrete shift along the previously defined circular step 5, the successive discrete positions of the visibility cone being perfectly known.

According to the invention, the association of the previously defined zones 15, 16, 17 and of these perfectly known successive discrete positions makes it possible to organize the sequencing of the beam aiming commands according to three consecutive phases. A first phase processes the aiming operations before their entry into the visibility cone, a second phase processes the aiming operations present in the visibility cone and a third phase processes the phasing operations that have left the visibility cone. For a given position of the visibility cone, each phase corresponds to one zone, i.e. the aiming operations processed in each phase belong to one and only one zone, the first phase corresponding to the first zone 15, the second phase corresponding to the second zone 16 and the third phase corresponding to the third zone 17.

The progress of the phases in the temporal domain may thus be unambiguously associated with the progress of the illumination of the above-mentioned zones, in the spatial domain, by the visibility cone 6 of the antenna, thus creating a well-defined space-time association between the processing phases of the aiming operations and their zones in space, this being achieved notably by the use, for example, of the synchronization signal created on the basis of the passage from one circular step to another.

At each synchronization signal, the partition of the space in the above-mentioned three zones 15, 16, 17 is updated, with the aimings, in the time interval between the two successive synchronization signals, undergoing specific processing operations depending on the zone to which they belong.

Figure 7:
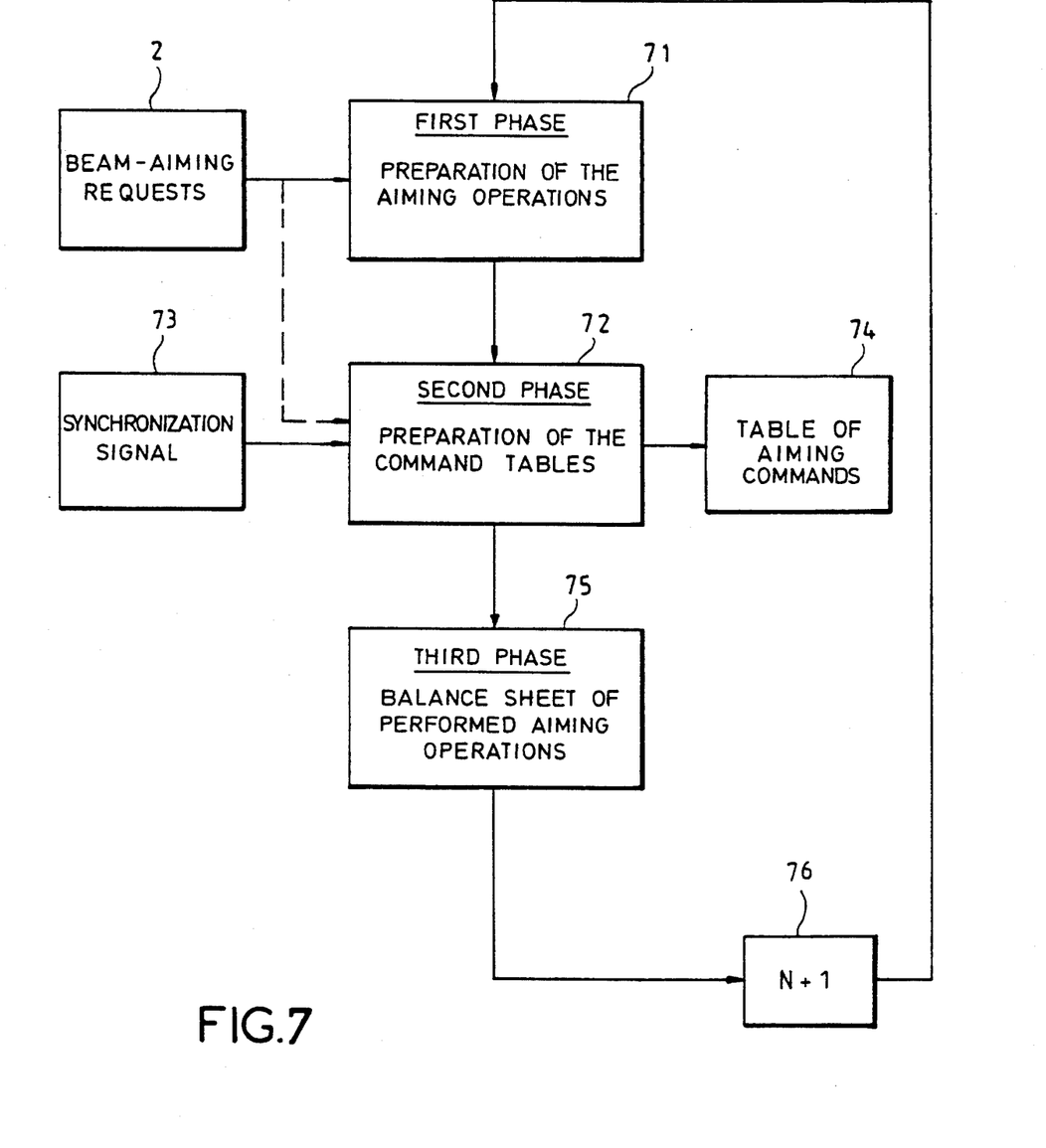
FIG. 7 gives an illustration, for a given aiming operation, of its different phases of processing.

FIG. 7 illustrates the life cycle of an aiming operation given by the progress of the successive processing phases that it undergoes. The first phase 71, associated with the above-mentioned first zone 15, relates to the beginning of the life of the aiming operations as a function of the aiming requests 2. Once born, the aiming is prepared in such a way as to build the table of commands of the beam. This preparation notably determines the characteristics to be sent relating to the aiming, position, waveform, order of priority or urgency and format of the message for example and, more generally, everything that the beam formation system needs in order to carry out the aiming of the beam.

The second phase 72, associated with the above-mentioned second zone 16, relates to all the living aiming operations, namely all the aiming operations located in the visibility cone. At each synchronization signal 73, a new aiming command table 74 is sent to the beam formation system, this table constituting the sequencing of the aiming operations performed between two synchronization signals. The command table to be sent at the next synchronization signal is set up on the basis of the aiming operations, born in the first phase, for which no command has yet been sent.

This table is also set up as a function of the urgent aiming operations born since the last synchronization as well as according to relative priorities or degrees of urgency among all these aiming operations, it being possible for a maximum period of execution of aiming operations to be laid down at each synchronization signal. It may also be a function of the work load of the radar.

The third phase 75, associated with the above-mentioned third zone 17, relates to all the living aiming operations coming out of the visibility cone. A balance-sheet of the aiming operations carried out is prepared by identifying the aiming operations for which a command has been sent and those for which no command has been sent, notably through lack of time. Certain information elements relating to these non-performed commands are memorized, if necessary, in order to be exploited at the next rotation. The information elements relating to the aiming operations that are performed are eliminated, these aiming operations becoming defunct. Aiming operations deemed to be unimportant may also die without having been performed.

After this third phase 75, there starts a new first phase 71 corresponding to the next antenna rotation 76.

Figure 8:
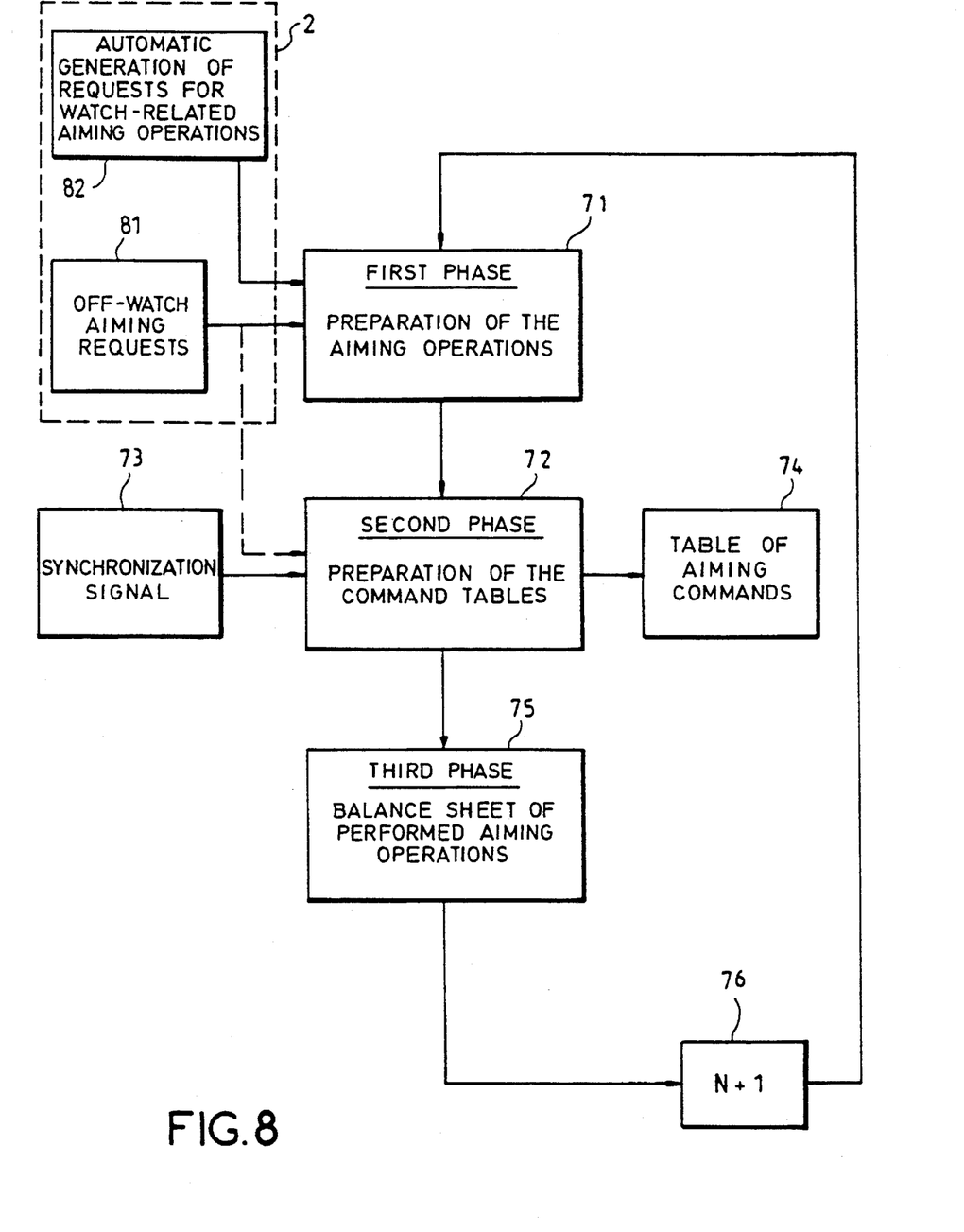
FIG. 8 shows the above-mentioned phases associated with an automatic generation of requests for watch-related aiming operations.

One permanent function that is generally used is the watch function. This calls for the scanning of the entire space by the antenna beam. The increase in the rotation speed of the antenna as well as the increasing number of other functions to be fulfilled makes it difficult to scan the entire space in only one antenna rotation. According to the invention, the scanning of space for the watch function is done in a number N of rotations. To this effect, an automatic generation of requests for watch-related aiming operations is created as illustrated by FIG. 8.

The aiming requests 2 are separated into off-watch aiming requests 81 and watch-related aiming requests 82 obtained by automatic generation. The object of the automatic generation of the watch notably is to give rise to watch-related aiming operations in the above-mentioned first phase 71, i.e. to select the watch-related aiming operations that must be carried out the next time that they pass into the visibility cone of the antenna. The selection is based, for example, on the partition, in terms of good weather and bad weather, of the space set up by the data processing of the radar which, depending on either of these cases, dictates specific waveforms for the part of space concerned.

Figure 9:
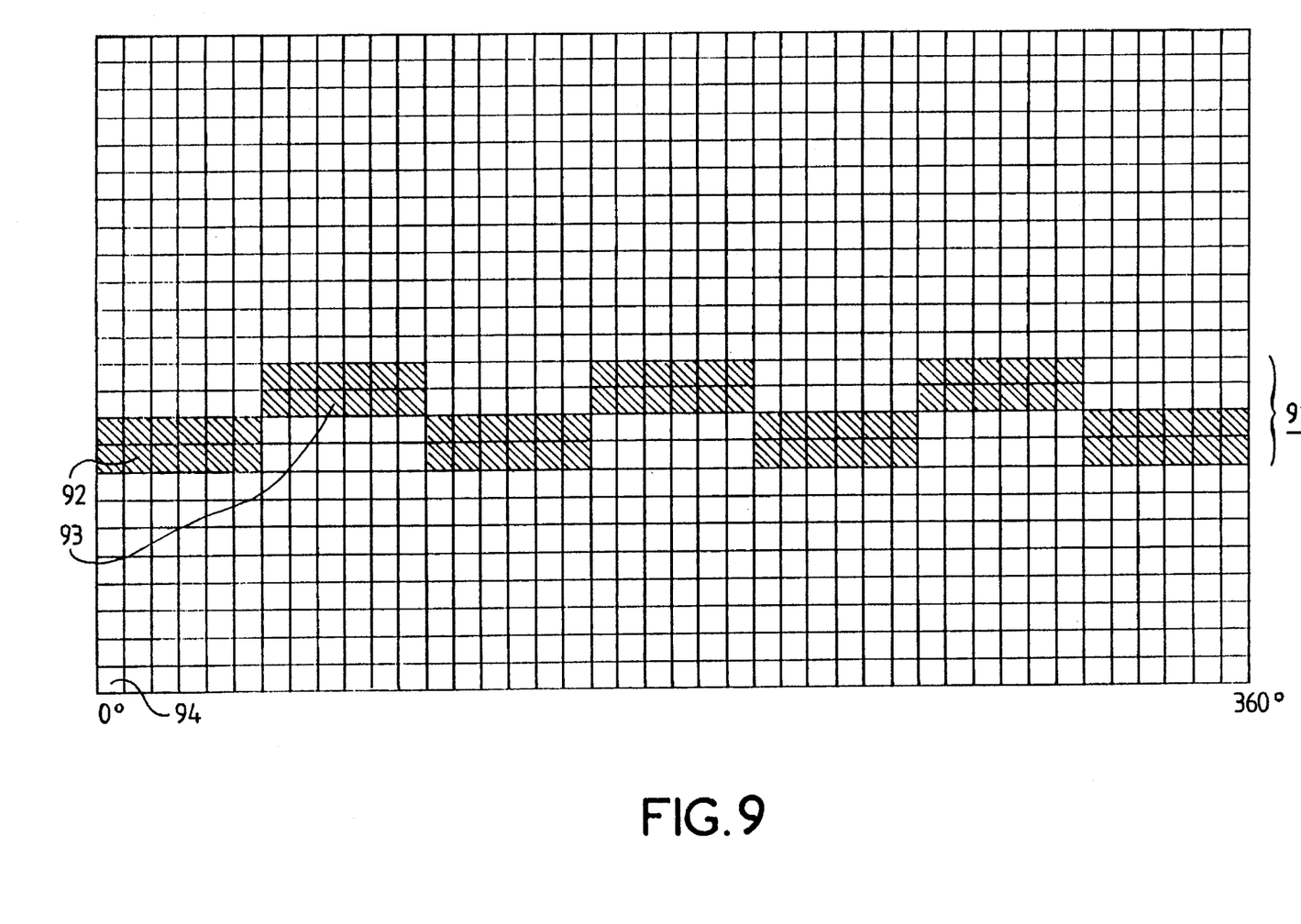
FIGS. 9 and 10 provide an illustration of the above-mentioned mechanism of automatic generation.
Figure 10:
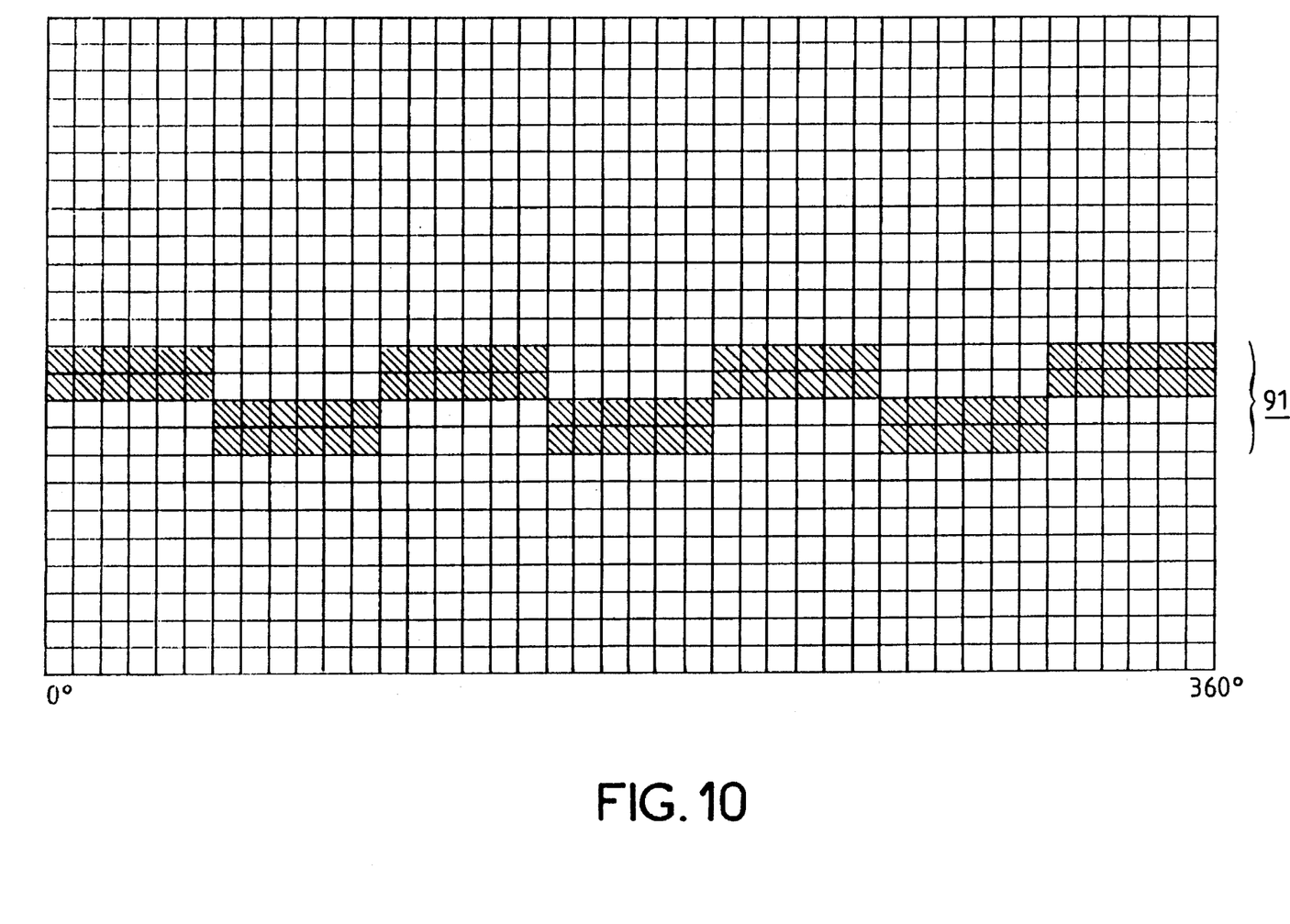

According to the invention, an implementation of the automatic generation of the watch-related aiming operations can be done, for example, in the manner described here below, as illustrated by FIGS. 9 and 10, for a part of the given space corresponding, for example, to a medium altitude.

This implementation of watch-related aiming generation makes it possible notably to have a high degree of control over the generation of the watch-related aiming operations.

The aiming operations are assembled in p consecutive patterns 92, 93, p being the number of antenna rotations needed so that the repetition of the patterns will cover the entire space 91 considered. p is therefore the period of selection of this space. In the example of FIG. 9, p=2. Each pattern 92 is chosen on r consecutive columns. In the example of FIG. 9, r=6. r is called the factor of repetition of the pattern for the period p. At the end of r columns, the selection is done on the next pattern 93, and at the end of p×r columns, the return is done on the first pattern 92. In the example of FIGS. 9 and 10, the space 91 is thus totally selected in two antenna rotations. FIG. 9 shows the aiming operations selected during a first antenna rotation, and FIG. 10 shows the other operations selected during the second antenna rotation, and so on and so forth. The factors of repetition are for example chosen so that, at the passage through the first column 94, namely at the passage through the 0° reference, there is no overlapping or breaking of the patterns.

The patterns may be different from one part of the space to another, depending on the altitude. Similarly, the period p may be different from one part of the space to another. One watch generation model is defined, for example, in terms of good weather and the other in terms of bad weather. The generation of the watch is done by steps, in azimuth for example. For each step, since the two models, corresponding to good weather and bad weather, are for example sustained, the pattern to be followed is determined as a function notably of the patterns followed at the previous columns and of the repetition factors. Then, the aiming operations of the model whose time mode corresponds, for example, to that recommended in the partition into good weather and poor weather are actually selected.

The method according to the invention makes it possible a priori to keep a planned watch load that is constant, to keep a radar watch load that is a priori homogeneous in azimuth and to ensure that all the watch-related aiming operations are performed, or in other words that the space is scanned in watching mode at the end of a given number of rotations. If a lack exists in watching mode, the third phase 75 makes it possible to carry out an aiming operation that is not performed at the following rotation or following period p.

The previously defined watch generation mechanism may be subjected to physical constraints of duration of visibility, per rotation, of a region of space. Indeed, if the radar occupancy is such that, in one region of space, all the aiming operations of one and the same domain of threat cannot be visited in watching mode, these aiming operations are all delayed from rotation to rotation and the watching cannot be done at the end of the planned number of rotations. To limit this phenomenon, it is possible to manage several watch models with different allocated periods of time. An assessment of the radar load may then be done to decide to switch over the watch model.

The partitioning of the space into elementary aiming spaces 12 may be adapted, for example, to the roundness of the earth, the number of elementary aiming spaces 12 diminishing notably with the increase in altitude.

What is claimed is:

1. A method for the management of the beam of an electronically scanned rotating antenna on the basis of requests for the aiming of the beam, said method organizing the sequencing or succession of the aiming commands given to a system for the formation of the beam by means of a table of commands comprising the parameters needed to carry out the aiming operations, the antenna having a visibility cone in which the electronic scanning enables the aiming operations to be performed, the position of the antenna being identified according to an angular step, the passage from one step another generating a synchronization signal, for each antenna rotation, the sequencing of the commands is organized in three phases, each associated with one zone of the space:

a first phase of preparation of the requested aiming operations before their entry into the visibility cone, said phase consisting in defining the parameters of the table of the commands associated with each requested aiming operation;

a second phase of carrying out the requested aiming operations present in the visibility cone, a new table of commands being sent from each synchronization signal as a function of the aiming operations that have not yet been carried out;

a third phase of identifying the requested aiming operations that have come out from the visibility cone and have not been carried out, these aiming operations being memorized and carried out in a following rotation, it being possible for a non-performed aiming operation to be relinquished.

2. A method according to claim 1, wherein urgent aiming operations requested during the second phase are performed in this phase.

3. A method according to claim 1, wherein the zones associated with the first and third phases do not overlap.

4. A method according to claim 1, wherein the requests for aiming operations designed for a watching function are generated automatically and processed like the other aiming requests according to the three phases.

5. A method according to claim 4 wherein, with the space around the antenna being partitioned into elementary aiming spaces, the elementary spaces being inscribed in columns for automatic generation, the aiming operations are assembled in a number p of consecutive patterns, p being the number of antenna rotations necessary for the repetition of patterns to cover the space considered, each pattern being chosen on a number r of consecutive columns, the passage being made to a following pattern at the end of r columns, the return being made to the first pattern at the end of p×r columns.

6. A method according to claim 5, wherein the patterns are different from one part of the space to another, as a function of the altitude.

7. A method according to claim 5, wherein the number p is different from one part of the space to another, as a function of the altitude.

8. A method according to claim 5, wherein the automatic generation includes one mode for a good weather state and another mode for a bad weather state.

9. A method according to claim 1, wherein the partitioning of the space is a function of the altitude.

10. A method according to claim 9, wherein the number of elementary aiming spaces diminishes with the altitude.

* * * * *